Patented July 14, 1936

2,047,811

UNITED STATES PATENT OFFICE 2,047,811

PROCESS OF MANUFACTURING GLYCOLS

Frederick A. Weihe, Jr., Detroit, Mich., assignor to McAleer Manufacturing Company, Detroit, Mich., a corporation of Michigan No Drawing. Application July 11, 1934,
Serial No. 734,689

8 Claims. (Cl. 260—156.5)

This invention relates to the manufacture of glycols or mixtures thereof from the halogen, or halogen-hydroxyl addition compounds of olefine and their derivatives.

The general chemical formula applying to these compounds can be expressed by $$R_1-C_n-H_{2n}-R,$$

where $R_1$ is a halogen and $R$ is either a halogen or a hydroxyl group. In the following description and claims these compounds will be referred to as olefin halides and halohydrins.

The invention is in particular to be applied to the olefin halides and halohydrins of chlorine and bromine of which ethylene dichloride, ethylene chlorohydrin and ethylene dibromide may be given as examples.

Heretofore glycols have been produced from materials selected from compounds defined above by the action of an alkali carbonate or bicarbonate in aqueous solutions. Such processes have been costly and are also attended with difficulties of excess pressure due to the fact that carbonic acid is generated making it necessary to valve off the gas to prevent this excessive pressure. The exhausted gas usually carries with it some of the volatile material even though a condenser is used to cool the escaping gas to a point below which material and water will vaporize excessively. Also, methods proposed heretofore and which use alkali carbonates or bicarbonates are difficult to control as the reaction originally starts with a high concentration of the alkali carbonate or bicarbonate and its resultant high pH value, and keeps diminishing as the reaction proceeds, thus resulting in a wide fluctuation of concentrations and pH value.

My invention has as an object to provide a process by means of which glycols or mixture thereof, can be produced economically and under easily controlled conditions. Other objects will appear hereinafter.

These objects are accomplished by the following invention which consists of reacting material selected from compounds defined above, water and an aqueous solution of an alkali in the presence of carbon dioxide, and under the influence of heat and pressure.

While a reaction will result at room temperature and atmospheric pressure, it will be appreciated that a process carried out under these conditions would obviously be too slow and inefficient, and, for commercial production, impractical, and for this reason heat and pressures are always used.

Depending on the particular compound or mixtures of compounds used in the process a temperature of as high as 325° F. may be used, but it should be borne in mind that if the temperature rises considerably higher than this the products are likely to be decomposed and to polymerize, and that the tendency to do so will increase with the increase of temperature.

The pressures employed in my process may be made as high or higher than 400 lbs. per square inch but it has been found that for all practical purposes no pressures higher than 400 lbs. need be used.

The reaction vessel to be used in my process should be able to withstand internal pressure and to be arranged to have heat applied thereto.

Such a reaction vessel is preferably an autoclave provided with a steam jacket, and means should be provided for agitating the contents.

The material which has been selected from the group of compounds defined above, for the manufacture of glycols, and water are charged into the chamber. Carbon dioxide gas is then forced into the chamber whereupon heat is applied to raise the temperature and the pressure. This is followed by adding an aqueous solution or slurry of an alkali at a rate depending on the rate at which the reaction progresses and until the reaction is completed.

By an alkali is meant any hydrate of the alkali metals and of the alkaline earthmetals which reacts with carbon dioxide to form a carbonate and bicarbonate, and also any non-oxidizing inorganic substance which, upon disassociation, will give an alkali reaction and will form a carbonate and bicarbonate.

A small amount of alkali solution or slurry is forced into the reaction vessel when temperature and pressure have attained the desired values. A slight drop in pressure will occur, but as the reaction proceeds, the original pressure is reobtained. Thus, the aqueous solution or slurry of the alkali is added in small increments until all the material used is converted into the corresponding glycol. By use of an automatic pressure regulator, this addition of the alkali in small increments approaches a continuous addition of the correct amount.

I have discovered that by putting the material, as previously defined, and water in about equal weights or more, into an agitated vessel capable of withstanding pressure, heating these products in the presence of carbon dioxide gas and incorporating thereto an aqueous solution or slurry of an alkali in small increments and at a rate regulated by the rate of reaction with the material, will result in the production of glycol or glycols with practically theoretical yields.

For purposes of illustration, the following examples are furnished:

*Example 1.*—1000 grams of a 40% solution of ethylene chlorohydrin is charged to an agitated closed vessel capable of withstanding pressure, such as an autoclave. Carbon dioxide gas is then run in until the gauge pressure is 100 lbs. to the square inch. Heat is now applied by means of a steam jacket until the contents of the autoclave are at 250° F. The pressure, due to the heat, will rise, but is not allowed to go over 200 lbs. to the square inch, by the addition of a 50% solution of caustic soda. Only a relatively small amount of caustic will be required to keep the pressure at 200 lbs. But as the caustic is consumed in the reaction, the pressure will rise so that another small amount of caustic must be added. By use of a pressure regulator, which actuates the inlet valve of the caustic, the amount of caustic is so regulated that a continuous small stream is being fed to the autoclave in just sufficient quantities to maintain the reaction. Caustic is continually incorporated until the pressure will not rise, at which time the reaction is complete.

*Example 2.*—1000 grams of a 40% solution of ethylene chlorohydrin is charged to an agitated autoclave. Carbon dioxide is run in until the pressure is 75 lbs. to the square inch. Heat is now applied until the contents are at 280° F. The pressure due to the heat will rise, but is not allowed to go over 150 lbs. to the square inch by the addition of a slurry of freshly hydrated lime. Only a relatively small amount of calcium hydrate will be required to keep the pressure at 150 lbs. But as the calcium hydrate is consumed in the reaction, the pressure regulator, which actuates the inlet valve of the calcium hydrate slurry, will regulate the flow of hydrate so that a continuous small stream is being fed into the autoclave in just sufficient quantities to maintain the reaction. The hydrate is continually incorporated until the pressure will not rise, at which time the reaction is complete.

*Example 3.*—600 grams of ethylene dichloride and 500 grams of water are charged to an agitated closed vessel capable of withstanding pressure, such as an autoclave. Carbon dioxide gas is then run in until the gauge pressure is 100 lbs. to the square inch. Heat is now applied by means of a steam jacket until the contents of the autoclave are at 300° F. The pressure, due to the heat, will rise, but is not allowed to go above 300 lbs. to the square inch by the addition of a 30% solution of caustic soda. Only a small amount of caustic will be required to keep the pressure at 300 lbs. As the caustic is consumed in the reaction, the pressure will rise so that another small amount of caustic must be added. By use of a pressure regulator, which actuates the inlet valve of the caustic, the amount of caustic is so regulated that a continuous small stream is being fed to the autoclave in just sufficient quantities to maintain the reaction. A yield of 90% of the theoretical will be obtained in 3–4 hours.

*Example 4.*—600 grams of ethylene dichloride and 500 grams of water are charged to an agitated closed vessel capable of withstanding pressure, such as an autoclave. Carbon dioxide is then run in until the gauge pressure is 150 lbs. to the square inch. Heat is now applied by means of a steam jacket until the contents of the autoclave are at 325° F. The pressure, due to the heat, will rise, but is not allowed to go above 400 lbs. to the square inch by the addition of a 30% solution of caustic soda. Only a small amount of caustic will be required to keep the pressure at 400 lbs. As the caustic is consumed in the reaction, the pressure will rise, so that caustic must be continuously fed to the autoclave as fast as the reaction consumes the small amount originally incorporated.

By adding the alkali to the autoclave, as noted in Example No. 1, it is possible to maintain a constant pH value over the entire time of reaction. When the small amount of alkali is added to the autoclave, it is immediately converted to the carbonate and thence to the bicarbonate. As there is still a surplus of carbon dioxide gas over that required to form the bicarbonate, an equilibrium is obtained between acid carbon dioxide gas and alkaline bicarbonate resulting in a pH value that is easily maintained. As the reaction proceeds, the concentration of bicarbonate diminishes and the carbon dioxide increases with an increase of pressure. Thus, maintaining a constant pressure by the addition of an alkali solution, results in a constant pH value. An exact determination of the pH value for optimum results is difficult to ascertain due to the fact that the liquid is under heat and pressure and is inclosed in an opaque vessel. But by maintaining a pressure greater than the vapor pressures of chlorohydrin and water, indicative of free carbon dioxide gas, it is possible to obtain any pH value between the high, as produced by the alkaline material, such as the sodium bicarbonate, and the low as produced by the acid material such as carbon dioxide gas.

I have found that the ideal pH value to maintain varies with the temperature maintained and the size and shape of autoclave used. Thus, no exact value can be stated, but must be determined by experimental means for each type of autoclave used. However, some free carbonic dioxide must be maintained in the autoclave for satisfactory results as it is the presence of this component that allows the maintenance of the determined satisfactory pH value.

In Example No. 2, the freshly prepared calcium hydrate slurry when forced into the autoclave, immediately forms the slightly soluble carbonate. But due to the fact that there is excess carbon dioxide present, the calcium carbonate will be considerably more soluble due to formation of the more soluble bicarbonate. The pH range obtainable by this method is very much narrowed, but apparently falls within a range that is entirely satisfactory.

The temperatures, pressures and proportions, as noted in the examples, may be varied to a considerable degree. However, the reaction proceeds at a faster rate if the temperature is elevated and preferably maintained between 230–300° F. The pressure used is a function of the temperature and the desired pH value that has been found best for the particular pressure vessel used for the reaction. The proportion of water and chlorohydrin may be varied to a considerable degree, though I have found that the amount of water should be sufficient to dissolve the chlorides formed and not produce a saturated solution. The amount of carbon dioxide gas used should be sufficient to form the amount of carbonate or bicarbonate concentration desired, plus a surplus to obtain the desired state of equilibrium.

The particular substances employed in the above examples, which are presented only by way of illustration, may of course, be substituted by other compounds of similar constitution. Thus propylene or butylene chlorohydrin or dichloride may be substituted for the ethylene chlorohydrin or dichloride. Likewise, the bromohydrins and dibromides may be used successfully. Also, caustic potash, barium hydrate and magnesium hydrate may be substituted for the alkalis used in the illustrations. I have found that the concentration of carbonate or bicarbonate in the reaction may be varied considerably without any appreciable difference. But, as the concentration of carbonate or bicarbonate increases, a corresponding increase of carbon dioxide must be used to compensate for any increase in alkaline value. For all practical purposes, I have found that a concentration of bicarbonate or carbonate from 1-5% is ample, though I do not wish to limit myself to these concentrations.

My process of making glycols from the materials stated above has the advantage of being considerably cheaper, than those proposed heretofore. Caustic soda is usually one-third as cheap or cheaper than the carbonate or bicarbonate. Also, where calcium hydrate is used, the resulting carbonate is dissolved to a much greater degree when there is surplus of carbon dioxide gas, as the more soluble bicarbonate is formed. The process, as described above, has the further advantage of being easily controlled in that any concentration of the hydrolying agent may be maintained and any pH value, within the equilibrium range of the ingredient used, may be maintained at any desired figure. Also, by being able to accurately control the reaction conditions, the formation of undesirable products are kept to a minimum. Still another advantage is that it is unnecessary to valve off carbon dioxide in order to prevent excessive pressures and the necessity of cooling this gas to recover any material used in the process that may vaporize.

In case the materials to be used in my process are produced on a commercial scale, and, if not subsequently further fractionated and purified, will be mixtures of compounds, and the product will not be a pure glycol but a mixture of glycols. For instance, in the production of ethylene dichloride from cracked petroleum gases there will also be present propylene and butylene dichlorides, and the product of my process will be a mixture of ethylene, propylene and butylene glycols.

As many apparent and widely different variations may be made in the process and ingredients used, it is not my intention to be limited except as indicated in the appended claims.

I claim:

1. The process of producing glycols which comprises reacting together, in the presence of water, carbon dioxide, an alkali and material selected from the group of compounds consisting of olefin chlorides and bromides, and chloro- and bromo- hydrins, said alkali being capable of reacting with carbon dioxide to form a carbonate and bicarbonate.

2. The process of claim 1, wherein the reaction takes place under the influence of heat and pressure.

3. The process of claim 1 wherein the quantity of carbon dioxide is in excess of that quantity necessary to convert all the alkali to carbonate and bicarbonate, thereby assuring complete conversion of the alkali into carbonates.

4. In the process as specified in claim 1, the step of gradually adding said alkali to the mixture of water, said material and carbon dioxide, and until the reaction is completed whereby the condition for hydrolysis as it proceeds may be controlled.

5. The process of producing glycols comprising the following steps: charging into a pressure chamber a mixture of water and material selected from the group of compounds consisting of olefin chlorides and bromides, and chloro- and bromo- hydrins, forcing carbon dioxide gas into said chamber, applying heat to said chamber to raise the temperature and the pressure, and then admitting to the contents an alkali capable of reacting with the said carbon dioxide to form a carbonate and bicarbonate, said alkali being admitted gradually throughout the reaction and until the same is completed whereby the condition for hydrolysis as it proceeds may be controlled, the total quantity of carbon dioxide being in excess of that quantity necessary to change all the alkali into the carbonates.

6. The process of claim 5 in which the material selected is ethylene dichloride.

7. The process of claim 5 in which the material selected is ethylene chlorohydrin.

8. The process of claim 5 in which the material selected is ethylene dibromide.

FREDERICK A. WEIHE, Jr.